(12) United States Patent
White et al.

(10) Patent No.: US 9,105,000 B1
(45) Date of Patent: Aug. 11, 2015

(54) AGGREGATING DATA FROM A PLURALITY OF DATA SOURCES

(71) Applicant: Palantir Technologies Inc., Palo Alto, CA (US)

(72) Inventors: Nicholas White, London (GB); Eli Bingham, New York, NY (US); Engin Ural, Brooklyn, NY (US); Jasjit Grewal, Brooklyn, NY (US)

(73) Assignee: Palantir Technologies Inc., Palo Alto, CA (US)

( * ) Notice: Subject to any disclaimer, the term of this patent is extended or adjusted under 35 U.S.C. 154(b) by 0 days.

(21) Appl. No.: 14/304,741

(22) Filed: Jun. 13, 2014

Related U.S. Application Data

(60) Provisional application No. 61/914,229, filed on Dec. 10, 2013.

(51) Int. Cl.
  *G06Q 10/00* (2012.01)
  *G06Q 10/06* (2012.01)
  *G06F 17/30* (2006.01)

(52) U.S. Cl.
  CPC .... *G06Q 10/06398* (2013.01); *G06F 17/30303* (2013.01)

(58) Field of Classification Search
  CPC .................. G06Q 10/06398; G06F 17/30303
  See application file for complete search history.

(56) References Cited

U.S. PATENT DOCUMENTS

| | | | |
|---|---|---|---|
| 5,428,776 A | 6/1995 | Rothfield | |
| 5,542,089 A | 7/1996 | Lindsay et al. | |
| 5,613,105 A | 3/1997 | Xbikowski et al. | |
| 5,826,021 A | 10/1998 | Mastors et al. | |
| 5,832,218 A | 11/1998 | Gibbs et al. | |
| 5,878,434 A | 3/1999 | Draper et al. | |
| 5,897,636 A | 4/1999 | Kaeser | |
| 5,966,706 A | 10/1999 | Biliris et al. | |

(Continued)

FOREIGN PATENT DOCUMENTS

| | | |
|---|---|---|
| EP | 2 634 745 | 9/2013 |
| GB | 2 366 498 | 3/2002 |

(Continued)

OTHER PUBLICATIONS

Anonymous, "A Real-World Problem of Matching Records," Nov. 2006, http://grupoweb.upf.es/bd-web/slides/ullman.pdf, pp. 1-16.

(Continued)

*Primary Examiner* — Tarek Chbouki
(74) *Attorney, Agent, or Firm* — Knobbe, Martens, Olson & Bear, LLP

(57) ABSTRACT

According to certain aspects, a computer system may be configured to aggregate and analyze data from a plurality of data sources. The system may obtain data from a plurality of data sources, each of which can include various types of data, including email data, system logon data, system logoff data, badge swipe data, employee data, job processing data, etc. associated with a plurality of individuals. The system may also transform data from each of the plurality of data sources into a format that is compatible for combining the data from the plurality of data sources. The system can resolve the data from each of the plurality of data sources to unique individuals of the plurality of individuals. The system can also determine an efficiency indicator based at least in part on a comparison of individuals of the unique individuals that have at least one common characteristic.

20 Claims, 8 Drawing Sheets

| 710 | 715 | 720 | 725 | 730 | 735 | 740 | 745 | 750 | 755 | 760 |
|---|---|---|---|---|---|---|---|---|---|---|
| Employee Name | ID | Position / Title | Location | Avg. Badge-in Time | Avg. Badge-out Time | Avg. No. of Processed Jobs | Efficiency | % of Total Emails Sent to Applicants | Avg. % of Total Emails Sent to Applicants for Others with Same Title | Change Comparison Group |
| Jane Doe | 29364 | Loan Processing Supervisor | A | 10:00am | 6:30pm | 15 | Medium | 80% | 52% | |
| John Smith | 32153 | Loan Processor | A | 8:00am | 5:00pm | 20 | High | 95% | 87% | |
| John Doe | 31578 | Loan Processor | B | 9:30am | 7:00pm | 10 | Low | 50% | 87% | |
| Jane Smith | 31985 | Loan Processor | C | 8:30am | 5:30pm | 19 | High | 85% | 87% | |

(56) References Cited

U.S. PATENT DOCUMENTS

| | | | |
|---|---|---|---|
| 6,006,242 A | 12/1999 | Poole et al. |
| 6,134,582 A | 10/2000 | Kennedy |
| 6,236,994 B1 | 5/2001 | Swartz et al. |
| 6,243,717 B1 | 6/2001 | Gordon et al. |
| 6,289,334 B1 | 9/2001 | Reiner et al. |
| 6,311,181 B1 | 10/2001 | Lee et al. |
| 6,321,274 B1 | 11/2001 | Shakib et al. |
| 6,463,404 B1 | 10/2002 | Appleby |
| 6,519,627 B1 | 2/2003 | Dan et al. |
| 6,523,019 B1 | 2/2003 | Borthwick |
| 6,851,108 B1 | 2/2005 | Syme et al. |
| 6,857,120 B1 | 2/2005 | Arnold et al. |
| 6,976,024 B1 | 12/2005 | Chavez et al. |
| 7,058,648 B1 | 6/2006 | Lightfoot et al. |
| 7,403,942 B1 | 7/2008 | Bayliss |
| 7,406,592 B1 | 7/2008 | Polyudov |
| 7,461,158 B2 | 12/2008 | Rider et al. |
| 7,519,589 B2 | 4/2009 | Charnock et al. |
| 7,627,489 B2* | 12/2009 | Schaeffer et al. ............... 705/2 |
| 7,757,220 B2 | 7/2010 | Griffith et al. |
| 7,783,679 B2 | 8/2010 | Bley |
| 7,853,573 B2 | 12/2010 | Warner et al. |
| 7,877,421 B2 | 1/2011 | Berger et al. |
| 7,908,521 B2 | 3/2011 | Sridharan et al. |
| 7,912,842 B1 | 3/2011 | Bayliss |
| 7,962,495 B2 | 6/2011 | Jain et al. |
| 7,979,424 B2 | 7/2011 | Dettinger et al. |
| 8,103,962 B2 | 1/2012 | Embley et al. |
| 8,117,022 B2 | 2/2012 | Linker |
| 8,126,848 B2 | 2/2012 | Wagner |
| 8,302,855 B2 | 11/2012 | Ma et al. |
| 8,364,642 B1 | 1/2013 | Garrod |
| 8,417,715 B1* | 4/2013 | Bruckhaus et al. ............ 707/758 |
| 8,429,194 B2 | 4/2013 | Aymeloglu et al. |
| 8,429,527 B1 | 4/2013 | Arbogast |
| 8,433,702 B1 | 4/2013 | Carrino et al. |
| 8,499,287 B2 | 7/2013 | Shafi et al. |
| 8,554,719 B2 | 10/2013 | McGrew |
| 8,560,494 B1 | 10/2013 | Downing |
| 8,601,326 B1 | 12/2013 | Kirn |
| 8,639,552 B1* | 1/2014 | Chen et al. ................... 705/7.21 |
| 2002/0035590 A1 | 3/2002 | Eibach et al. |
| 2002/0095360 A1 | 7/2002 | Joao |
| 2002/0103705 A1 | 8/2002 | Brady |
| 2002/0184111 A1 | 12/2002 | Swanson |
| 2003/0004770 A1 | 1/2003 | Miller et al. |
| 2003/0023620 A1 | 1/2003 | Trotta |
| 2003/0039948 A1 | 2/2003 | Donahue |
| 2003/0093401 A1 | 5/2003 | Czajkowski et al. |
| 2003/0105759 A1 | 6/2003 | Bess et al. |
| 2003/0105833 A1 | 6/2003 | Daniels |
| 2003/0115481 A1 | 6/2003 | Baird et al. |
| 2003/0177112 A1 | 9/2003 | Gardner |
| 2003/0182313 A1 | 9/2003 | Federwisch et al. |
| 2003/0212718 A1 | 11/2003 | Tester |
| 2004/0003009 A1 | 1/2004 | Wilmot |
| 2004/0006523 A1 | 1/2004 | Coker |
| 2004/0034570 A1 | 2/2004 | Davis |
| 2004/0083466 A1 | 4/2004 | Dapp et al. |
| 2004/0088177 A1* | 5/2004 | Travis et al. ................... 705/1 |
| 2004/0098731 A1 | 5/2004 | Demsey et al. |
| 2004/0103088 A1 | 5/2004 | Cragun et al. |
| 2004/0139212 A1 | 7/2004 | Mukherjee et al. |
| 2004/0153451 A1 | 8/2004 | Phillips et al. |
| 2004/0210763 A1 | 10/2004 | Jonas |
| 2005/0004911 A1 | 1/2005 | Goldberg et al. |
| 2005/0010472 A1 | 1/2005 | Quatse et al. |
| 2005/0021397 A1 | 1/2005 | Cui et al. |
| 2005/0097441 A1 | 5/2005 | Herbach et al. |
| 2005/0131935 A1 | 6/2005 | O'Leary et al. |
| 2005/0226473 A1 | 10/2005 | Ramesh |
| 2005/0262493 A1 | 11/2005 | Schmidt et al. |
| 2005/0262512 A1 | 11/2005 | Schmidt et al. |
| 2005/0278286 A1 | 12/2005 | Djugash et al. |
| 2006/0004740 A1 | 1/2006 | Dettinger et al. |
| 2006/0010130 A1 | 1/2006 | Leff et al. |
| 2006/0070046 A1 | 3/2006 | Balakrishnan et al. |
| 2006/0074967 A1 | 4/2006 | Shaburov |
| 2006/0080316 A1 | 4/2006 | Gilmore et al. |
| 2006/0080616 A1 | 4/2006 | Vogel et al. |
| 2006/0143075 A1 | 6/2006 | Carr et al. |
| 2006/0209085 A1 | 9/2006 | Wong et al. |
| 2006/0218206 A1 | 9/2006 | Bourbonnais et al. |
| 2006/0218491 A1 | 9/2006 | Grossman et al. |
| 2006/0253502 A1 | 11/2006 | Raman et al. |
| 2006/0288046 A1 | 12/2006 | Gupta et al. |
| 2007/0000999 A1 | 1/2007 | Kubo et al. |
| 2007/0027851 A1 | 2/2007 | Kruy et al. |
| 2007/0067285 A1 | 3/2007 | Blume et al. |
| 2007/0094248 A1 | 4/2007 | McVeigh et al. |
| 2007/0113164 A1 | 5/2007 | Hansen et al. |
| 2007/0168336 A1 | 7/2007 | Ransil et al. |
| 2007/0178501 A1* | 8/2007 | Rabinowitz et al. ............ 435/6 |
| 2007/0192281 A1 | 8/2007 | Cradick et al. |
| 2007/0233756 A1 | 10/2007 | D'Souza et al. |
| 2007/0260582 A1 | 11/2007 | Liang |
| 2007/0271317 A1 | 11/2007 | Carmel |
| 2007/0284433 A1 | 12/2007 | Domenica et al. |
| 2007/0299697 A1 | 12/2007 | Friedlander et al. |
| 2008/0005063 A1 | 1/2008 | Seeds |
| 2008/0126344 A1* | 5/2008 | Hoffman et al. ................ 707/5 |
| 2008/0126951 A1* | 5/2008 | Sood et al. .................... 715/752 |
| 2008/0140387 A1 | 6/2008 | Linker |
| 2008/0195672 A1 | 8/2008 | Hamel et al. |
| 2008/0201313 A1 | 8/2008 | Dettinger et al. |
| 2008/0215543 A1 | 9/2008 | Huang et al. |
| 2008/0228467 A1 | 9/2008 | Womack et al. |
| 2008/0267386 A1* | 10/2008 | Cooper .................... 379/265.06 |
| 2008/0270316 A1 | 10/2008 | Guidotti et al. |
| 2008/0281580 A1 | 11/2008 | Zabokritski |
| 2008/0313132 A1 | 12/2008 | Hao et al. |
| 2009/0006150 A1 | 1/2009 | Prigge et al. |
| 2009/0007056 A1 | 1/2009 | Prigge et al. |
| 2009/0055487 A1* | 2/2009 | Moraes et al. ................ 709/206 |
| 2009/0083275 A1 | 3/2009 | Jacob et al. |
| 2009/0094217 A1 | 4/2009 | Dettinger et al. |
| 2009/0106178 A1 | 4/2009 | Chu |
| 2009/0106242 A1 | 4/2009 | McGrew |
| 2009/0112745 A1 | 4/2009 | Stefanescu |
| 2009/0144747 A1 | 6/2009 | Baker |
| 2009/0161147 A1 | 6/2009 | Klave |
| 2009/0164387 A1 | 6/2009 | Armstrong et al. |
| 2009/0193012 A1 | 7/2009 | Williams |
| 2009/0228507 A1 | 9/2009 | Jain et al. |
| 2009/0234720 A1 | 9/2009 | George et al. |
| 2009/0248721 A1 | 10/2009 | Burton et al. |
| 2009/0271343 A1 | 10/2009 | Vaiciulis et al. |
| 2009/0299830 A1* | 12/2009 | West et al. .................... 705/11 |
| 2009/0313311 A1 | 12/2009 | Hoffmann et al. |
| 2010/0057622 A1 | 3/2010 | Faith et al. |
| 2010/0070464 A1 | 3/2010 | Aymeloglu et al. |
| 2010/0070531 A1 | 3/2010 | Aymeloglu et al. |
| 2010/0082541 A1 | 4/2010 | Kottomtharayil |
| 2010/0082671 A1* | 4/2010 | Li et al. ........................ 707/770 |
| 2010/0098318 A1 | 4/2010 | Anderson |
| 2010/0114817 A1 | 5/2010 | Broeder et al. |
| 2010/0114831 A1 | 5/2010 | Gilbert et al. |
| 2010/0145902 A1 | 6/2010 | Boyan et al. |
| 2010/0145909 A1 | 6/2010 | Ngo |
| 2010/0161646 A1 | 6/2010 | Ceballos et al. |
| 2010/0169376 A1 | 7/2010 | Chu |
| 2010/0199167 A1 | 8/2010 | Uematsu et al. |
| 2010/0204983 A1 | 8/2010 | Chung et al. |
| 2010/0306285 A1 | 12/2010 | Shah et al. |
| 2011/0035396 A1 | 2/2011 | Merz et al. |
| 2011/0066497 A1* | 3/2011 | Gopinath et al. ............ 705/14.53 |
| 2011/0093490 A1 | 4/2011 | Schindlauer et al. |
| 2011/0131547 A1 | 6/2011 | Elaasar |
| 2011/0208822 A1* | 8/2011 | Rathod ....................... 709/206 |
| 2011/0252282 A1* | 10/2011 | Meek et al. .................... 714/54 |
| 2011/0258216 A1 | 10/2011 | Supakkul et al. |
| 2011/0270871 A1 | 11/2011 | He et al. |
| 2012/0078595 A1 | 3/2012 | Balandin et al. |
| 2012/0102022 A1 | 4/2012 | Miranker et al. |

(56) References Cited

U.S. PATENT DOCUMENTS

| | | | |
|---|---|---|---|
| 2012/0136804 A1 | 5/2012 | Lucia | |
| 2012/0191446 A1 | 7/2012 | Binsztok et al. | |
| 2013/0096968 A1* | 4/2013 | Van Pelt et al. | 705/7.13 |
| 2013/0124193 A1 | 5/2013 | Holmberg | |
| 2013/0132348 A1 | 5/2013 | Garrod et al. | |
| 2013/0151453 A1 | 6/2013 | Bhanot et al. | |
| 2013/0198624 A1 | 8/2013 | Aymeloglu et al. | |
| 2013/0226944 A1* | 8/2013 | Baid et al. | 707/756 |
| 2013/0232220 A1 | 9/2013 | Sampson | |
| 2014/0006404 A1 | 1/2014 | McGrew et al. | |
| 2014/0012886 A1 | 1/2014 | Downing et al. | |
| 2014/0074888 A1 | 3/2014 | Potter et al. | |
| 2014/0108074 A1* | 4/2014 | Miller et al. | 705/7.11 |
| 2014/0115589 A1 | 4/2014 | Marinelli, III et al. | |
| 2014/0115610 A1 | 4/2014 | Marinelli, III et al. | |

FOREIGN PATENT DOCUMENTS

| | | |
|---|---|---|
| WO | WO 2009/051987 | 4/2009 |
| WO | WO 2010/030917 | 3/2010 |
| WO | WO 2010/030919 | 3/2010 |

OTHER PUBLICATIONS

Anonymous, "Frequently Asked Questions about Office Binder 97," http://web.archive.org/web/20100210112922/http://support.microsoft.com/kb/843147 printed Dec. 18, 2006 in 5 pages.
Bae et al., "Partitioning Algorithms for the Computation of Average Iceberg Queries," DaWaK 2000, LNCS 1874, pp. 276-286.
Donjerkovic et al., "Probabilistic Optimization of Top N Queries," Proceedings of the 25th VLDB Conference, Edinburgh, Scotland, 1999, pp. 411-422.
Fang et al., "Computing Iceberg Queries Efficiently," Proceedings of the 24th VLDB Conference New York, 1998, pp. 299-310.
Gu et al., "Record Linkage: Current Practice and Future Directions," Jan. 15, 2004, pp. 32.
Han et al., "Efficient Computation of Iceberg Cubes with Complex Measures," ACM Sigmod, May 21-24, 2001, pp. 1-12.
Karp et al., "A Simple Algorithm for Finding Frequent Elements in Streams and Bags," ACM Transactions on Database Systems, vol. 28, No. 1, Mar. 2003, pp. 51-55.
Leela et al., "On Incorporating Iceberg Queries in Query Processors," Technical Report, TR-2002-01, Database Systems for Advanced Applications Lecture Notes in Computer Science, 2004, vol. 2973.
Lim et al., "Resolving Attribute Incompatibility in Database Integration: An Evidential Reasoning Approach," Department of Computer Science, University of Minnesota, 1994, http://reference.kfupm.edu.sa/content/r/e/resolving_attribute_incompatibility_in_d_531691.pdf, pp. 1-10.
Litwin et al., "Multidatabase Interoperability," IEEE Computer, Dec. 1986, vol. 19, No. 12, http://www.lamsade.dauphine.fr/~litwin/mdb-interoperability.pdf, pp. 10-18.
Liu et al., "Methods for Mining Frequent Items in Data Streams: An Overview," Knowledge and Information Systems, vol. 26, No. 1, Jan. 2011, pp. 1-30.
Nadeau et al., "A Survey of Named Entity Recognition and Classification," Jan. 15, 2004, pp. 20.
Nin et al., "On the Use of Semantic Blocking Techniques for Data Cleansing and Integration," 11th International Database Engineering and Applications Symposium, 2007, pp. 9.
Qiang et al., "A Mutual-Information-Based Approach to Entity Reconciliation in Heterogeneous Databases," Proceedings of 2008 International Conference on Computer Science & Software Engineering, IEEE Computer Society, New York, NY, Dec. 12-14, 2008, pp. 666-669.
Sekine et al., "Definition, Dictionaries and Tagger for Extended Named Entity Hierarchy," May 2004, pp. 1977-1980.
Xobni, http://www.xobni.com, printed Jun. 26, 2014 in 5 pages.
Xobni, "About Page," http://www.xobni.com/about/, printed Jun. 26, 2014 in 2 pages.
Xobni, "Blog," http://blog.xobni.com/, printed Jun. 26, 2014 in 11 pages.
Zhao et al., "Entity Matching Across Heterogeneous Data Sources: An Approach Based on Constrained Cascade Generalization," Data & Knowledge Engineering, vol. 66, No. 3, Sep. 2008, pp. 368-381.
"A Quick Guide to UniProtKB Swiss-Prot & TrEMBL," Sep. 2011, pp. 2.
"A Tour of Pinboard," http://pinboard.in/tour as printed May 15, 2014 in 6 pages.
Bogle, Phillip Lee, "Reducing Cross-Domain Call Overhead Using Batched Futures," May 1994, Massachusetts Institute of Technology, pp. 96.
Canese et al., "Chapter 2: PubMed: The Bibliographic Database," The NCBI Handbook, Oct. 2002, pp. 1-10.
Delcher et al., "Identifying Bacterial Genes and Endosymbiont DNA with Glimmer," BioInformatics, vol. 23, No. 6, 2007, pp. 673-679.
"E-MailRelay," as downloaded from http://web.archive.org/web/20080821175021/http://emailrelay.sourceforge.net/ Aug. 21, 2008, pp. 2.
Kitts, Paul, "Chapter 14: Genome Assembly and Annotation Process," The NCBI Handbook, Oct. 2002, pp. 1-21.
Madden, Tom, "Chapter 16: The BLAST Sequence Analysis Tool," The NCBI Handbook, Oct. 2002, pp. 1-15.
Mendes et al., "TcruziKB: Enabling Complex Queries for Genomic Data Exploration," IEEE International Conference on Semantic Computing, Aug. 2008, pp. 432-439.
Mizrachi, Ilene, "Chapter 1: GenBank: The Nuckeotide Sequence Database," The NCBI Handbook, Oct. 2002, pp. 1-14.
Russell et al., "NITELIGHT: A Graphical Tool for Semantic Query Construction," 2008, pp. 10.
Sigrist, et al., "PROSTIE, a Protein Domain Database for Functional Characterization and Annotation," Nucleic Acids Research, 2010, vol. 38, pp. D161-D166.
Sirotkin et al., "Chapter 13: The Processing of Biological Sequence Data at NCBI," The NCBI Handbook, Oct. 2002, pp. 1-11.
Smart et al., "A Visual Approach to Semantic Query Design Using a Web-Based Graphical Query Designer," 16th International Conference on Knowledge Engineering and Knowledge Management (EKAW 2008), Acitrezza, Catania, Italy, Sep. 29-Oct. 3, 2008, pp. 16.
"The FASTA Program Package," fasta-36.3.4, Mar. 25, 2011, pp. 29.
European Search Report in European Application No. EP08730336.8, dated Jun. 6, 2012.
European Search Report in European Application No. EP 09813700.3, dated Apr. 3, 2014.
Official Communication in European Application No. EP 08839003.4 dated Aug. 14, 2012.
Official Communication in European Application No. EP 13157474.1 dated May 28, 2013.
Official Communication in New Zealand Application No. 616212 dated Oct. 9, 2013.
Official Communication in New Zealand Application No. 616212 dated May 7, 2014.
Official Communication in New Zealand Application No. 622389 dated Mar. 20, 2014.
Official Communication in New Zealand Application No. 622404 dated Mar. 20, 2014.
Official Communication in New Zealand Application No. 622484 dated Apr. 2, 2014.

* cited by examiner

| Employee Name 710 | ID 715 | Position / Title 720 | Location 725 | Avg. Badge-in Time 730 | Avg. Badge-out Time 735 | Avg. No. of Processed Jobs 740 | Efficiency 745 | % of Total Emails Sent to Applicants 750 | Avg. % of Total Emails Sent to Applicants for Others with Same Title 755 |
|---|---|---|---|---|---|---|---|---|---|
| Jane Doe | 29364 | Loan Processing Supervisor | A | 10:00am | 6:30pm | 15 | Medium | 80% | 52% |
| John Smith | 32153 | Loan Processor | A | 8:00am | 5:00pm | 20 | High | 95% | 87% |
| John Doe | 31578 | Loan Processor | B | 9:30am | 7:00pm | 10 | Low | 50% | 87% |
| Jane Smith | 31985 | Loan Processor | C | 8:30am | 5:30pm | 19 | High | 85% | 87% |
| ...... | | | | | | | | | |

Change Comparison Group 760

FIG. 7

AGGREGATING DATA FROM A PLURALITY OF DATA SOURCES

INCORPORATION BY REFERENCE TO ANY PRIORITY APPLICATIONS

This application claims the benefit of U.S. Provisional Application No. 61/914,229, filed Dec. 10, 2013, the entire content of which is incorporated herein by reference. Any and all applications for which a foreign or domestic priority claim is identified in the Application Data Sheet as filed with the present application are hereby incorporated by reference under 37 CFR 1.57.

TECHNICAL FIELD

The present disclosure relates to systems and techniques for data integration and analysis. More specifically, the present disclosure relates to aggregating data from a plurality of data sources and analyzing the aggregated data.

BACKGROUND

Organizations and/or companies are producing increasingly large amounts of data. Data may be stored across various storage systems and/or devices. Data may include different types of information and have various formats.

SUMMARY

The systems, methods, and devices described herein each have several aspects, no single one of which is solely responsible for its desirable attributes. Without limiting the scope of this disclosure, several non-limiting features will now be discussed briefly.

In one embodiment, a computer system configured to aggregate and analyze data from a plurality of data sources comprises: one or more hardware computer processors configured to execute code in order to cause the system to: obtain data from a plurality of data sources, each of the plurality of data sources comprising one or more of: email data, system logon data, system logoff data, badge swipe data, employee data, software version data, software license data, remote access data, phone call data, or job processing data associated with a plurality of individuals; detect inconsistencies in formatting of data from each of the plurality of data sources; transform data from each of the plurality of data sources into a format that is compatible for combining the data from the plurality of data sources; associate the data from each of the plurality of data sources to unique individuals of the plurality of individuals; and determine efficiency indicators for respective individuals based at least in part on a comparison of data associated with the respective individuals and other individuals that have at least one common characteristic.

In another embodiment, a computer system configured to aggregate and analyze data from a plurality of data sources comprises: one or more hardware computer processors configured to execute code in order to cause the system to: access data from a plurality of data sources, each of the plurality of data sources comprising one or more of: email data, system logon data, system logoff data, badge swipe data, employee data, software version data, software license data, remote access data, phone call data, or job processing data associated with a plurality of individuals; detect inconsistencies in formatting of datum from respective data sources; associate respective datum from the plurality of data sources to respective individuals of the plurality of individuals; and provide statistics associated with respective individuals based on data associated with the respective individuals from the plurality of data sources. In certain embodiments, the code is further configured to cause the computer system to: transform respective datum from the plurality of data sources into one or more formats usable to generate the statistics.

In yet another embodiment, a non-transitory computer readable medium comprises instructions for aggregating and analyzing data from a plurality of data sources that cause a computer processor to: access data from a plurality of data sources, each of the plurality of data sources comprising one or more of: email data, system logon data, system logoff data, badge swipe data, employee data, software version data, software license data, remote access data, phone call data, or job processing data associated with a plurality of individuals; detect inconsistencies in formatting of datum from respective data sources; associate respective datum from the plurality of data sources to respective individuals of the plurality of individuals; and provide statistics associated with respective individuals based on data associated with the respective individuals from the plurality of data sources. In certain embodiments, the instructions are further configured to cause the computer processor to: transform respective datum from the plurality of data sources into one or more formats usable to generate the statistics.

BRIEF DESCRIPTION OF THE DRAWINGS

FIG. 7 illustrates another example user interface displaying an output of a data analysis system.

DETAILED DESCRIPTION

Overview

Organizations and/or companies may generate, collect, and store large amounts of data related to activities of employees. Such data may be stored across various storage systems and/or devices and may have different formats. For example, data of an organization may be stored in different locations (e.g., different cities, countries, etc.) and different types of media (disk storage, tapes, etc.). Data may be available in the form of web services, databases, flat files, log files, etc. Even within the same organization, the format of various data sources can be different (e.g., different identifiers can be used to refer to an employee). Therefore, it may be difficult to query and extract relevant information from vast amounts of data scattered in different data sources. Accordingly, there is a need for aggregating and analyzing data from various data sources in an efficient and effective way in order to obtain meaningful analysis. For example, there is a need for improved analysis of data from multiple data sources in order to track activities of and determine productivity of employees.

As disclosed herein, a data analysis system may be configured to aggregate and analyze data from various data sources. Such data analysis system may also be referred to as a "data pipeline." The data pipeline can accept data from various data sources, transform and cleanse the data, aggregate and resolve the data, and generate statistics and/or analysis of the data. The data analysis system can accept data in different formats and transform or convert them into a format that is compatible for combining with data from other data sources. The data analysis system can also resolve the data from different sources and provide useful analysis of the data. Because data from any type or number of data sources can be resolved and combined, the resulting analysis can be robust and provide valuable insight into activities relating to an organization or company. For example, a company can obtain analysis relating to employee email activity, employee efficiency, real estate resource utilization, etc. As used herein, combining of data may refer to associating data items from different data sources without actually combining the data items within a data structure, as well as storing data from multiple data sources together.

Data Pipeline

Figure 1:
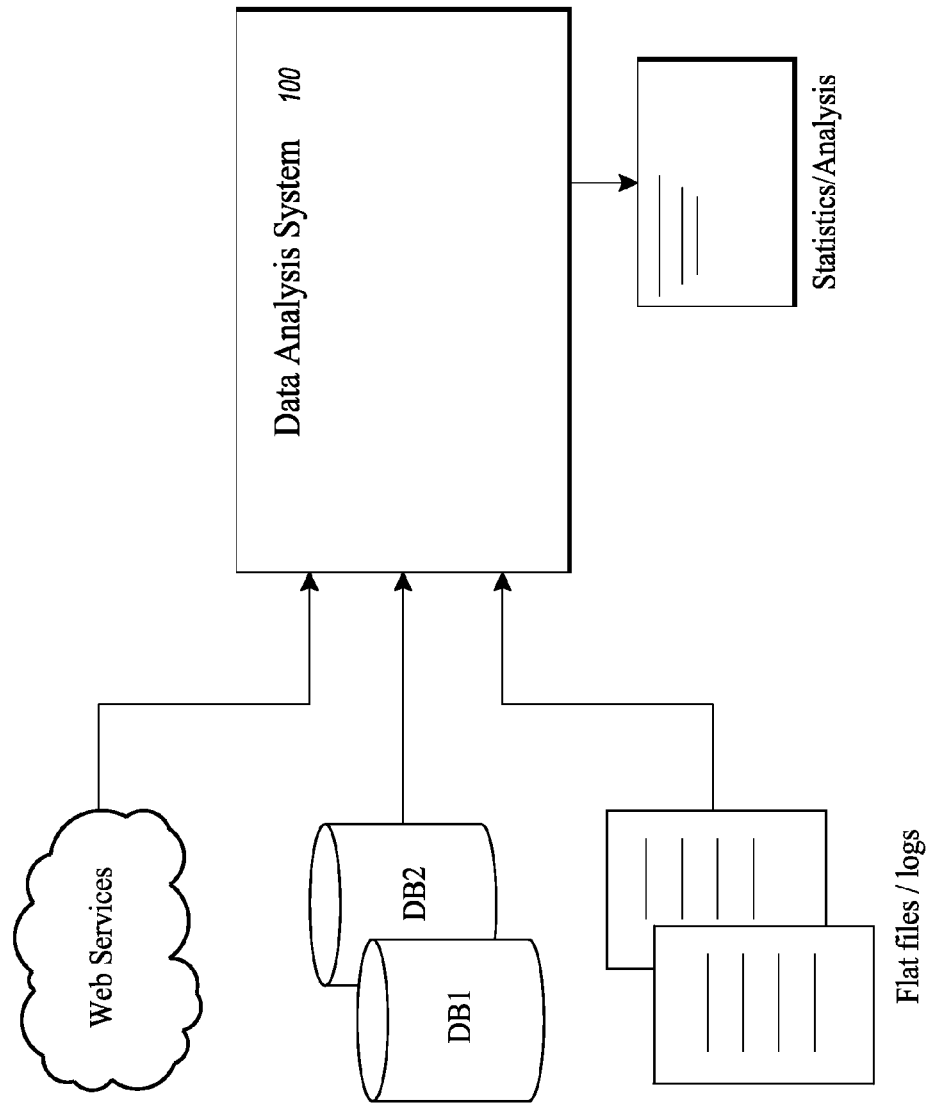
FIG. 1 is a block diagram illustrating one embodiment of a data analysis system configured to aggregate and analyze data from a plurality of data sources.

FIG. 1 is a block diagram illustrating one embodiment of a data analysis system 100 configured to aggregate and analyze data from a plurality of data sources. The data sources may provide data in various data formats that are accepted by the data analysis system 100, such as web services, databases, flat files, log files, etc. The data can be in various formats. In some instances, the data may be defined as CSV, in rows and columns, in XML, etc. The data analysis system 100 can accept data from multiple data sources and produce statistics and/or analysis related to the data. Some examples of types of data sources that the data analysis system 100 can accept as input include employee data, email data, phone log data, email log data, single sign-on (SSO) data, VPN login data, system logon/logoff data, software version data, software license data, remote access data, badge swipe data, etc.

The data analysis system 100 can function as a general transform system that can receive different types of data as input and generate an output specified by an organization or company. For example, the data analysis system 100 can accept employee data and email data of an organization and output a list of top 10 email senders or recipients for each employee. The output from the data analysis system 100 may package the aggregated data in a manner that facilitates querying and performing analysis of the data. One type of querying and/or analysis may be operational efficiency analysis.

Figure 2:
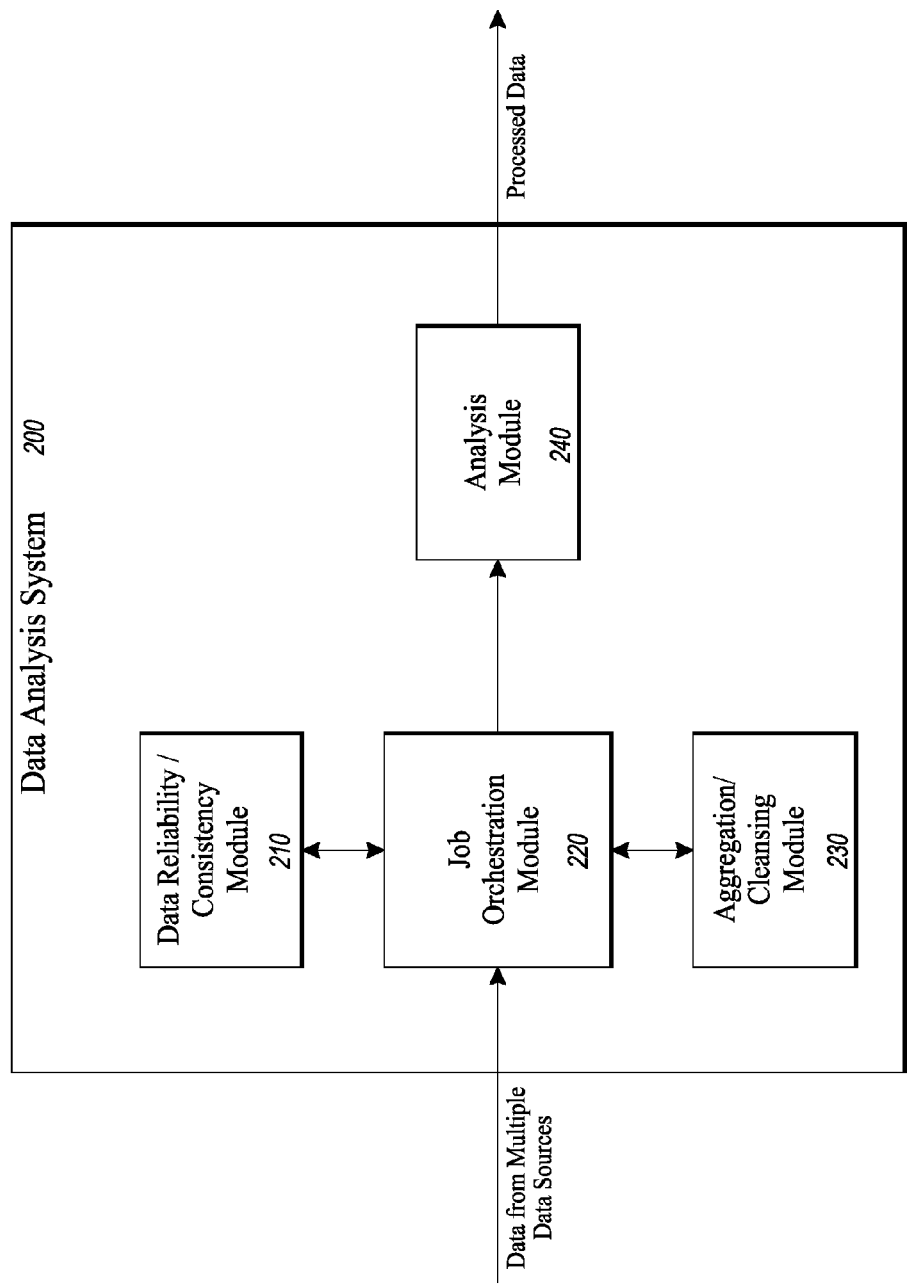
FIG. 2 is a block diagram illustrating components of the data analysis system of FIG. 1, according to one embodiment.

FIG. 2 is a block diagram illustrating components of the data analysis system 100 of FIG. 1, according to one embodiment. The data analysis system 200 of FIG. 2 can be similar to the data analysis system 100 of FIG. 1. The data analysis system 200 can accept data from multiple data sources and output processed data. The system 200 can include a data reliability/consistency module 210, a job orchestration module 220, an aggregation/cleansing module 230, and an analysis module 240. The system 200 can include fewer or additional modules or components, depending on the embodiment. One or more modules may be combined or reside on the same computing device, depending on the embodiment. In certain embodiments, functions performed by one module in the system 200 may be performed by another module in the system 200.

The data reliability/consistency module 210 may perform quality reliability tests on various data sources. The system 200 may have access to information about the format of a data source, and the data reliability/consistency module 210 can detect whether the format of the data from the data source is consistent with the expected format. Performing reliability tests prior to aggregating the data can ensure that the output and analysis generated by the system 200 is reliable. Details relating to quality reliability test are explained further below.

The job orchestration module 220 may automate jobs for aggregating, cleansing, and/or analyzing the data. The job orchestration module 220 can manage steps involved in each process and scheduling the steps. For example, the job orchestration module 220 can define and schedule steps for transforming and resolving data from multiple data sources. The job orchestration module 220 can define workflows for various processes, e.g., through coordinated sequences of commands, scripts, jobs, etc. In some embodiments, the system 200 uses open source tools, such as Rundeck, Kettle, etc.

Cleansing/Aggregation

The aggregation/cleansing module 230 aggregates and/or cleanses data from various sources. "Cleansing" may refer to transforming and resolving the data from various sources so that they can be combined. Data in different sources may not be readily combined although the data may relate to a common entity (e.g., an employee or group of employees) and/or same type of information (e.g., time). For example, the IDs used to identify an employee can be different from one data source to another. In such case, the IDs may be mapped so that they can be resolved to specific employees. The system 200 may identify a standard identifier that can map two or more employee IDs used by different data sources to a particular employee. One example of a standard identifier can be the employee's email address. If both data sources include the corresponding email addresses for employee IDs, the data from the two sources can be associated with an employee associated with the email addresses.

In another example, data sources may include timestamp or time data (e.g., employee badge-in time, employee badge-out time, etc.), but the time information in data received from different sources may have the same time reference and, thus, may not be in local time zone of any particular employee (except those employees that may be in the standard time reference used by the organization). For example, an organization may have locations in various time zones, but all timestamps may be represented in UTC (Coordinated Universal Time) or GMT (Greenwich Mean Time) format. In order to make comparison across different time zones, the time information may need to be converted or adjusted according to the local time zone. Each employee's timestamp can be shifted or adjusted so that the time information reflects the local time. The aggregation/cleansing module 230 may obtain the local time zone information based on the employee's city, state, and country information in order to make the appropriate adjustment. Data for employees related to time (e.g., time arrived at office, time checked-out for lunch, etc.) may then be compared in a more meaningful manner with the time entries converted to represent local times. The examples above have been explained for illustrative purposes, and cleansing can include any processing that is performed on the data from multiple sources in order to combine them.

Once the data from various data sources are cleansed, they can be combined and aggregated. For example, multiple different IDs can be mapped to the same employee (or other entity) based on a common or standard identifier such that data using any of those multiple different IDs can each be associated with the same employee. The vast amounts of data can be joined and combined so that they are available for analysis.

In some embodiments, the data can be imported into and aggregated using a distributed computing framework (e.g., Apache Hadoop). A distributed computing framework may allow for distributed processing of large data sets across clusters of computers. Such framework may provide scalability for large amounts of data. Data may be cleansed and/or aggregated using a software that facilitates querying and managing of large data sets in distributed storage (e.g., Apache Hive).

The aggregation/cleansing module 230 can generate an output from the combined data. The output can be defined as appropriate by the organization or company that is requesting the data analysis. The output may combine data and provide an intermediate format that is configured for further analysis, such as querying and/or other analysis. In one example, employee data and email data are aggregated in order to provide an intermediate outcome that may be analyzed to provide insights into employee email activity. For example, an organization may have about 5 billion emails, but querying all emails can be slow and may not yield valuable information. Instead, the aggregation/cleansing module 230 can aggregate the email data and provide an intermediate output including data such as a list of top email senders, top email recipients, top sender domains, top recipient domains, number of sent emails, number of received emails, etc. for each employee. This intermediate output, which is a reduced amount of data, may then be considered in querying. Using the intermediate output, the aggregation/cleansing module 230 may search for top sender/recipient domains, top email sending employees, top email receiving employees, etc. For instance, the aggregation/cleansing module 230 can search through the intermediate output (which can include, e.g., top email senders, top email recipients, top sender domains, top recipient domains, number of sent emails, number of received emails, etc. for each employee) in order to produce statistics and/or analysis for the entire organization (e.g., information such as top email sending employees, top email receiving employees, top domains, etc. and/or information output in user interfaces illustrated in FIGS. 6-7). In this manner, the data can be analyzed and reduced in a manner that makes it easier for organizations to ask questions about various aspects of their operations or business. For instance, a company may be interested in finding out information on its operational efficiency.

In another example, the aggregation/cleansing module 230 can output the number of emails an employee sends in 15-minute buckets (e.g., how many emails an employee has sent every 15 minutes). This output can serve as an intermediate output for determining a relationship between the number of emails an employee sends and employee efficiency or productivity. In other embodiments, the aggregation/cleansing module 230 can generate an output that is not used as an intermediate output for analysis, but that can be directly output to the users (e.g., information output in user interfaces illustrated in FIGS. 6-7). In certain embodiments, the aggregation/cleansing module 230 may provide combined data to the analysis module 240, and the analysis module 240 may generate the intermediate output. For example, the aggregation/cleansing module 230 may resolve and combine the data sets, and the analysis module 240 can generate an intermediate output from the combined data set.

Analysis

The analysis module 240 can perform analysis based on the output from the aggregation/cleansing module 230. For example, the analysis module 240 can perform queries for answering specific questions relating to the operations of an organization. One example question may be what are the top domains that send emails to employees of an organization. The analysis module 240 can search through the top sender domains for all employees and produce a list of top sender domains. The analysis module 240 may be an analysis platform that is built to interact with various outputs from the data analysis system 200, which users from an organization can use to obtain answers to various questions relating to the organization. In some embodiments, the output from the aggregation/cleansing module 230 may be an intermediate output for facilitating further analysis. In other embodiments, the output from the aggregation/cleansing module 230 may be a direct output from the cleansing and/or aggregating step that does not involve an intermediate output.

Quality Reliability Tests

As mentioned above, the system 200 can perform quality reliability tests to determine the reliability of the data from various data sources. The data reliability/consistency module 210 of the system 200 can perform the reliability tests. The data reliability/consistency module 210 can detect inconsistencies and/or errors in the data from a data source. The data reliability/consistency module 210 may have access to information about data from a certain data source, such as the typical size of the data, typical format and/or structure of the data, etc. The data reliability/consistency module 210 may refer to the information about a data source in order to detect inconsistencies and/or errors in received data.

The data reliability/consistency module 210 can flag a variety of issues, including: whether the file size is similar to the file size of previous version of the data, whether the population count is similar to the previously received population count, whether the structure of the data has changed, whether the content or the meaning of the data has changed, etc. In one embodiment, population count may refer to the number of items to expect, for example, as opposed to their size. For example, the data reliability/consistency module 210 can identify that the content or the meaning of a column may have changed if the information used to be numeric but now is text, or if a timestamp used to be in one format but now is in a different format. Large discrepancies or significant deviations in size and/or format can indicate that the data was not properly received or pulled.

The data reliability/consistency module 210 can run one or more tests on data received from a data source. If the data reliability/consistency module 210 determines that data from a data source is not reliable, the system 200 may attempt to pull or receive the data again and run reliability tests until the data is considered sufficiently reliable. By making sure that the data of a data source is reliable, the system 200 can prevent introducing inaccurate data into the analysis further down the process.

In some embodiments, the data reliability/consistency module 210 may also perform quality reliability tests on aggregated data to make sure that the output from the aggregation/cleansing module 230 does not have errors or inconsistencies. In one example, the number of unique employees may be known or expected to be around 250,000. However, if the resolved number of unique employees is much more or less than the known or expected number, this may indicate an error with the output. In such case, the data reliability/consistency module 210 can flag issues with the output and prevent introduction of error in later steps of the process.

Employee Email Activity Example

In one embodiment, the data analysis system 200 aggregates data relating to employees of an organization, such as email activity of the employees. For example, an organization may be interested in finding out about any patterns in employee email activity and employee efficiency. The data analysis system 200 accepts data from at least two data sources: one data source that includes employee data and another data source that includes email data. The email data may be available in the form of email logs from an email server application (e.g., Microsoft Exchange), for example, and may include information such as sender, recipient, subject, body, attachments, etc. The employee data may be accessed in one or more databases, for example, and may include information such as employee ID, employee name, employee email address, etc.

The data reliability/consistency module 210 can perform quality reliability tests on data received from each of the data sources. For example, the data reliability/consistency module 210 can compare the file size of the employee data against the file size of the previously received version of the employee data, or the data reliability/consistency module 210 can compare the file size against an expected size. The data reliability/consistency module 210 can also check whether the structure of the employee data has changed (e.g., number and/or format of rows and columns). The data reliability/consistency module 210 can also run similar tests for the email data. The data reliability/consistency module 210 can check the file size, structure, etc. If the data reliability/consistency module 210 determines that the data from a data source has errors or inconsistencies, the system 200 may try to obtain the data again. The data reliability/consistency module 210 can run the reliability tests on the newly received data to check whether it is now free of errors and/or inconsistencies. Once all (or selected samplings) of the data from the data sources is determined to be reliable, the system 200 can cleanse and aggregate the data from the data sources.

The job orchestration module 220 can schedule the steps involved in cleansing and aggregating data from the various sources, such as employee data and email data. For example, the job orchestration module 220 can define a series of commands to be performed to import data from multiple data sources and transform the data appropriately for combining. As explained above, the data from the data sources can be imported into a distributed computing framework that can accommodate large amounts of data, such as Hadoop. The data can be cleansed and aggregated using the distributed computing framework.

The aggregation/cleansing module 230 can map the employee data and the email data by using the employee's email address. The email data may include emails that have the employee's email address as either the sender or the recipient, and these emails can be resolved to the employee who has the corresponding email address. By mapping the email address to employee ID, the email data can be resolved to unique individuals. After resolving the data to unique individuals, the aggregation/cleansing module 230 can aggregate the data and generate an intermediate output that can be used to perform further analysis (e.g., by the analysis module 240).

Because the size of email data in an organization can be quite large (e.g., 5 billion emails), analyzing all emails after they have been resolved to unique individuals may not be the most efficient way to proceed. Accordingly, the aggregation/cleansing module 230 may make the amount of data to be analyzed more manageable by aggregating or summarizing the data set. In a specific example, the aggregation/cleansing module 230 generates a list of top email senders and top email recipients for each employee from all of the emails associated with that employee. For instance, the aggregation/cleansing module 230 can generate an output of top email senders in the format "sender name," "sender domain," and "number of emails from sender" (e.g., "John Doe," "gmail.com," "10"). The aggregation/cleansing module 230 can extract the domain information from the sender email address to provide the sender domain information. The aggregation/cleansing module 230 can generate an output of top email recipients for an employee in a similar manner. The aggregation/cleansing module 230 may also extract file extensions for attachments and generate a list of types of attachments and counts of attachments for each employee. The aggregation/cleansing module 230 can generate any intermediate output of interest for each employee, and such intermediate output can be used in further analysis by the analysis module 240. In some embodiments, the intermediate output may be directly output to the users. For example, the system 200 may display in the user interface the list of top senders and top recipients for employees who send and/or receive the most number of emails within the organization.

The users in an organization can interact with the analysis module 240 in order to obtain information regarding operational efficiency. In the above example, the analysis module 240 may produce a list of employees who send the highest number of emails, employees who receive the highest number of emails, employees who receive the highest number of attachments, top domains for all emails, etc. for the whole organization. The final output can be based on the intermediate output for each employee. For example, the top domains for all emails can be determined by querying which domains are most common in the top sender domains and top recipient domains for all employees.

In certain embodiments, the email activity may be compared with other activities of employees (e.g., loan processing as explained below) to determine whether certain patterns or trends in an employee's email activity affect employee efficiency. In some embodiments, the analysis module 240 can generate an efficiency indicator for each employee based on the combined and aggregated data from multiple data sources. An efficiency indicator can provide information relating to the efficiency of an employee. The efficiency indicator may be based on some or all aspects of employee activity.

Loan Processing Example

In another embodiment, the data analysis system 200 accepts data from data sources relating to loan processing. For example, the data analysis system 200 can receive employee data, loan processing data, and other related information in order to analyze employee efficiency in processing loans and factors affecting employee efficiency. The data reliability/consistency module 210 can perform any relevant quality reliability tests on each of the data sources.

The aggregation/cleansing module 230 can cleanse and combine the data from multiple data sources. Any combination of data can be aggregated. For instance, the employee data and the loan processing data can be combined with one or more of: software version or upgrade data, employee arrival/departure time data, training platform data, etc. In one example, the employee data and the loan processing data are combined with software version or upgrade data, and the resulting data may show that employees that have a certain version of the software are more efficient. In another example, the employee data and the loan processing data are combined with employee arrival time, and the resulting data may show that employees who arrive earlier in the day are more efficient.

The analysis module 240 may compare a group of individuals who have one or more common characteristics against each other. For example, a group may be defined by the same position, manager, department, location, etc. The members within a group may be compared to analyze trends. The analysis module 240 may also compare one group against another group. For instance, one group may report to one manager, and another group may report to a different manager. A group of individuals that share a common characteristic may be referred to as a "cohort." Comparison of groups or cohorts may reveal information about why one group is more efficient than another group. For example, the analysis of the resulting data may show that Group A is more efficient than Group B, and the software for Group A was recently upgraded whereas the software for Group B has not been. Such correlation can allow the organization to decide whether and when to proceed with the software upgrade for Group B.

Real Estate Resource Example

In certain embodiments, the data analysis system 200 can accept data relating to real estate resources of an organization. The data sources may include information relating to one or more of: real estate resource data, costs associated with various real estate resources, state of various real estate resources, employees assigned to various real estate resources, functions assigned to various real estate resources, etc. For example, the data analysis system 200 can accept real estate resource data and employee activity data from multiple data sources. The data from multiple data sources can be combined to analyze whether certain real estate resources can be merged, eliminated, temporarily replace other resources during emergencies, etc. For example, if there are multiple locations of an organization within the same city, it may make sense to merge the offices based on the analysis. Organizations may also determine which real estate resources can carry on fundamental business processes during emergencies or natural disasters, e.g., as part of business continuity planning. The analysis module 240 can perform such analysis based on the resulting output from the aggregation/cleansing module 230. In some embodiments, the aggregation/cleansing module 230 may produce an intermediate output that can be used by the analysis module 240.

Other Examples

In some embodiments, employee activity data can be combined and analyzed to detect any security breaches. The data analysis system 200 can aggregate employee data relating to badge-in time, badge-out time, system login/logout time, VPN login/logout time, etc. in order to identify inconsistent actions. For example, if an employee badged in at 9:30 am at the office and logged on to the system at 9:32 am, but there is a VPN login at 9:30 am, the data analysis system 200 can identify that the VPN login is probably not by the employee.

Figure 3:
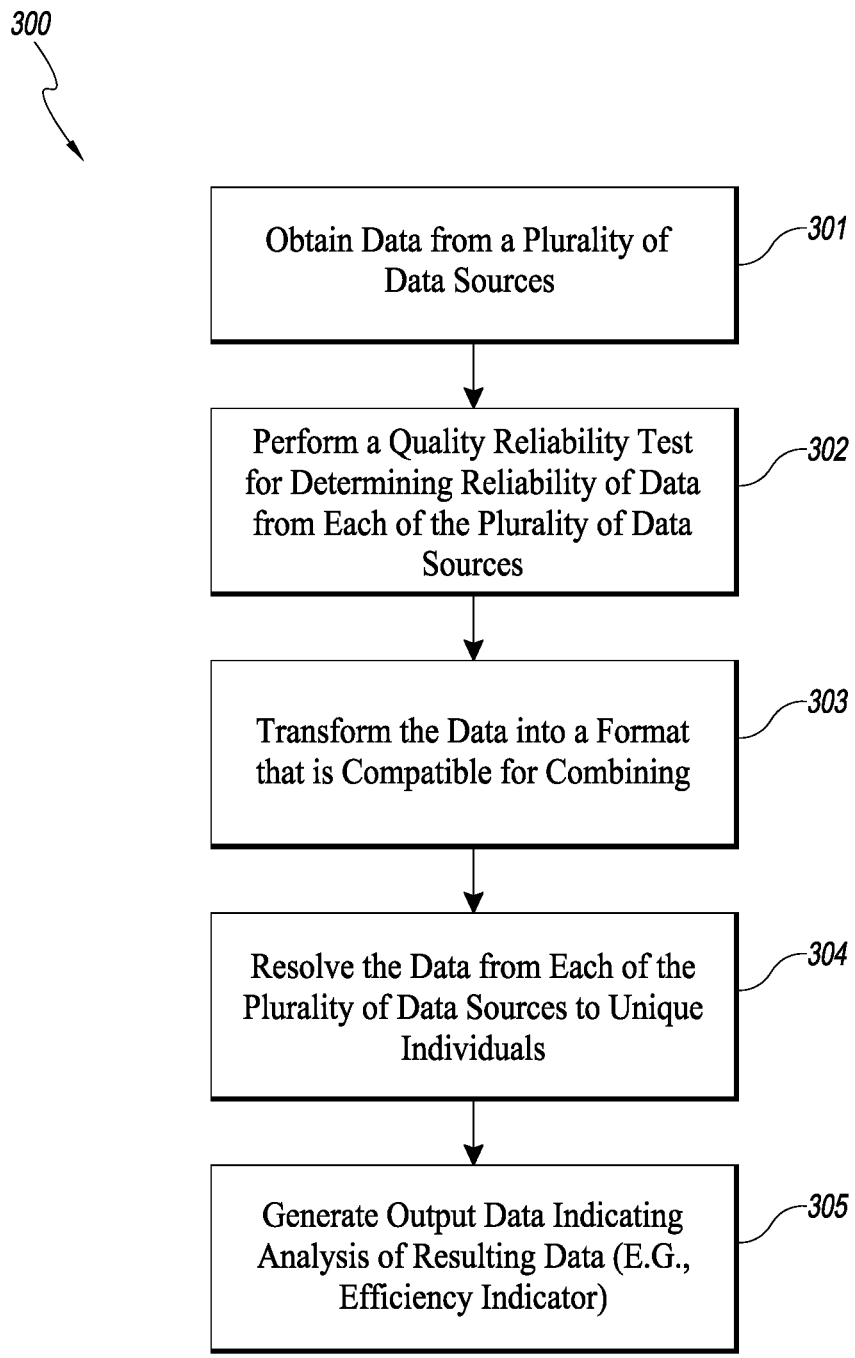
FIG. 3 is a flowchart illustrating one embodiment of a process for aggregating and analyzing data from a plurality of data sources.

FIG. 3 is a flowchart illustrating one embodiment of a process 300 for aggregating and analyzing data from a plurality of data sources. The process 300 may be implemented by one or more systems described with respect to FIGS. 1-2 and 8. For illustrative purposes, the process 300 is explained below in connection with the system 100 in FIG. 1. Certain details relating to the process 300 are explained in more detail with respect to FIGS. 1-2 and 4-8. Depending on the embodiment, the process 300 may include fewer or additional blocks, and the blocks may be performed in an order that is different than illustrated.

At block 301, the data analysis system 100 accesses and/or obtains data from a plurality of data sources. In the examples of employee monitoring, the data sources can include various data types, including one or more of: email data, system logon data, system logoff data, badge swipe data, employee data, software version data, software license data, remote access data, phone call data, job processing data, etc. associated with a plurality of individuals. The type of data source accepted by the system 100 can include a database, a web service, a flat file, a log file, or any other format data source. The data in one data source can have a different format from the data in another data source.

At block 302, the system 100 performs a quality reliability test for determining reliability of data from each of the plurality of data sources. Quality reliability tests may be based on expected characteristics of data from a particular data source. Each data source may have a different set of expected characteristics. In one embodiment, the system 100 detects inconsistencies in formatting of data from each of the plurality of data sources. In one embodiment, the system 100 may perform multiple reliability tests on data from each of the plurality of data sources in order to identify any errors or inconsistences in data received from the data sources. For example, the system 100 can check whether the file size matches expected file size, structure of the data matches expected structure, and/or number of entries matches expected number of entries, among other data quality checks. Any significant deviations may signal problems with a particular data source. Details relating to performing quality reliability tests are further explained in connection with FIG. 4.

At block 303, the system 100 transforms the data into a format that is compatible for combining and/or analysis. When the data from different data sources are imported into the system 100, the data from the data sources may not be in a format that can be combined. In one example, time information may be available from multiple data sources, but one time data source can use the universal time, and another data source can use local time. In such case, the time data in one of the data sources should be converted to the format of the other data source so that the combined data has the time same reference.

At block 304, the system 100 resolves the data from each of the plurality of data sources to unique individuals. Unique individuals may be a subset of the plurality of individuals with whom the data from the plurality of data sources is associated. For example, some data sources may include information about individuals who are not employees (e.g., consultants), and such data may not be resolved to specific employees. The system 100 may resolve the data from each of the plurality of data sources at least partly by mapping a column in one data source to a column in another data source.

At block 305, the system 100 generates output data indicating analysis of the resolved data, such as efficiency indicators that are calculated using algorithms that consider data of employees gathered from multiple data sources. In one embodiment, the system 100 determines an efficiency indicator based at least in part on a comparison of individuals of the unique individuals that have at least one common characteristic. The at least one common characteristic can be the same title, same position, same location, same department, same manager or supervisor, etc.

In certain embodiments, the system 100 may generate an intermediate output based on the resolved data, and the system 100 can determine an efficiency indicator based on the intermediate output. The intermediate output may be a reduced version of the resolved data. A reduced version may not contain all of the resolved data, but may include a summary or aggregation of some of the resolved data. For example, the reduced version of employee email data does not contain all employee emails, but can include a list of top senders and top recipients for each employee.

In one embodiment, a first data source of the plurality of data sources includes employee data, and a second data source of the plurality of data sources includes email data.

The system 100 can resolve the data from each of the plurality of data sources by resolving the employee data and the email data to unique employees. The efficiency indicator can indicate an efficiency level associated with an employee out of the unique employees.

Figure 4:
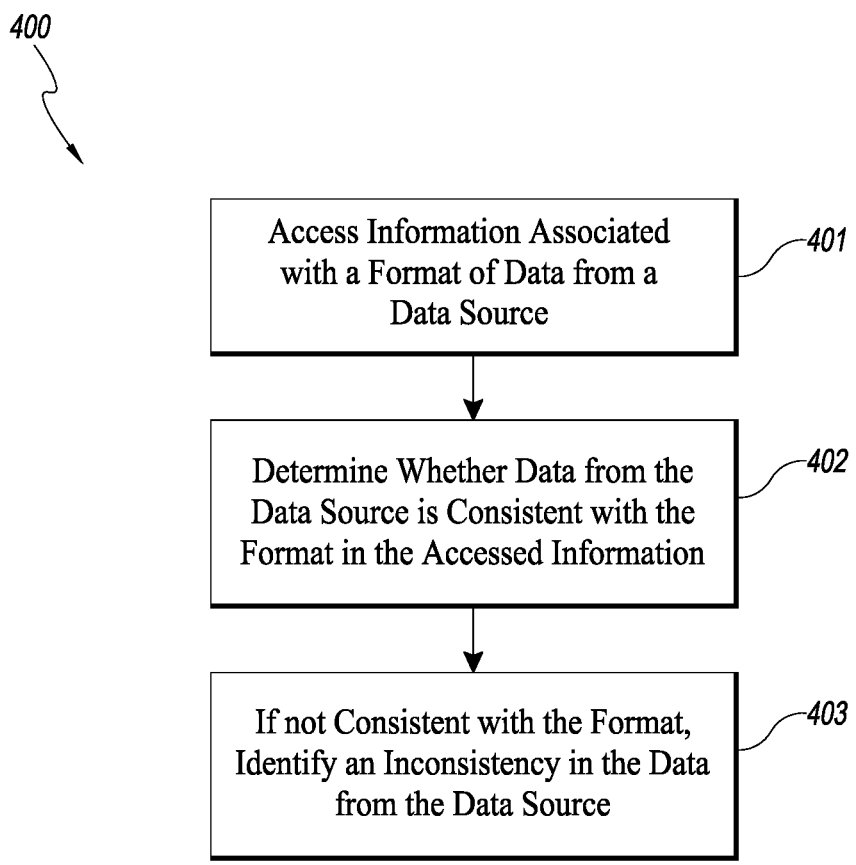
FIG. 4 is a flowchart illustrating one embodiment of a process for performing a quality reliability test for determining the reliability of data from one or more of a plurality of data sources.

FIG. 4 is a flowchart illustrating one embodiment of a process 400 for performing a quality reliability test for determining the reliability of data from one or more of a plurality of data sources. The process 400 may be implemented by one or more systems described with respect to FIGS. 1-2 and 8. For illustrative purposes, the process 400 is explained below in connection with the system 100 in FIG. 1. Certain details relating to the process 400 are explained in more detail with respect to FIGS. 1-3 and 5-8. Depending on the embodiment, the process 400 may include fewer or additional blocks, and the blocks may be performed in an order that is different than illustrated.

At block 401, the data analysis system 100 accesses information associated with a format of data from a data source. The information may specify the structure of data (e.g., number of columns, type of data for each column, etc.), expected size of the data, expected number of entries in the data, etc. For example, each data source (or set of data sources) may have a different format.

At block 402, the system 100 determines whether data from a data source is consistent with the expected format of data as indicated in the accessed data format information. For example, the system 100 can check if the structure of the data is consistent with the expected format. The system 100 can also check if the size of the data is similar to the expected size of the data.

At block 403, if data from a data source is not consistent with the expected format, size, or other expected characteristic, the system 100 identifies an inconsistency in the data from the data source. If the system 100 identifies any inconsistencies, the system 100 can output indications of the inconsistency in the data to the user. The system 100 may also attempt to obtain the data from the data source until the data no longer has inconsistencies.

Figure 5:
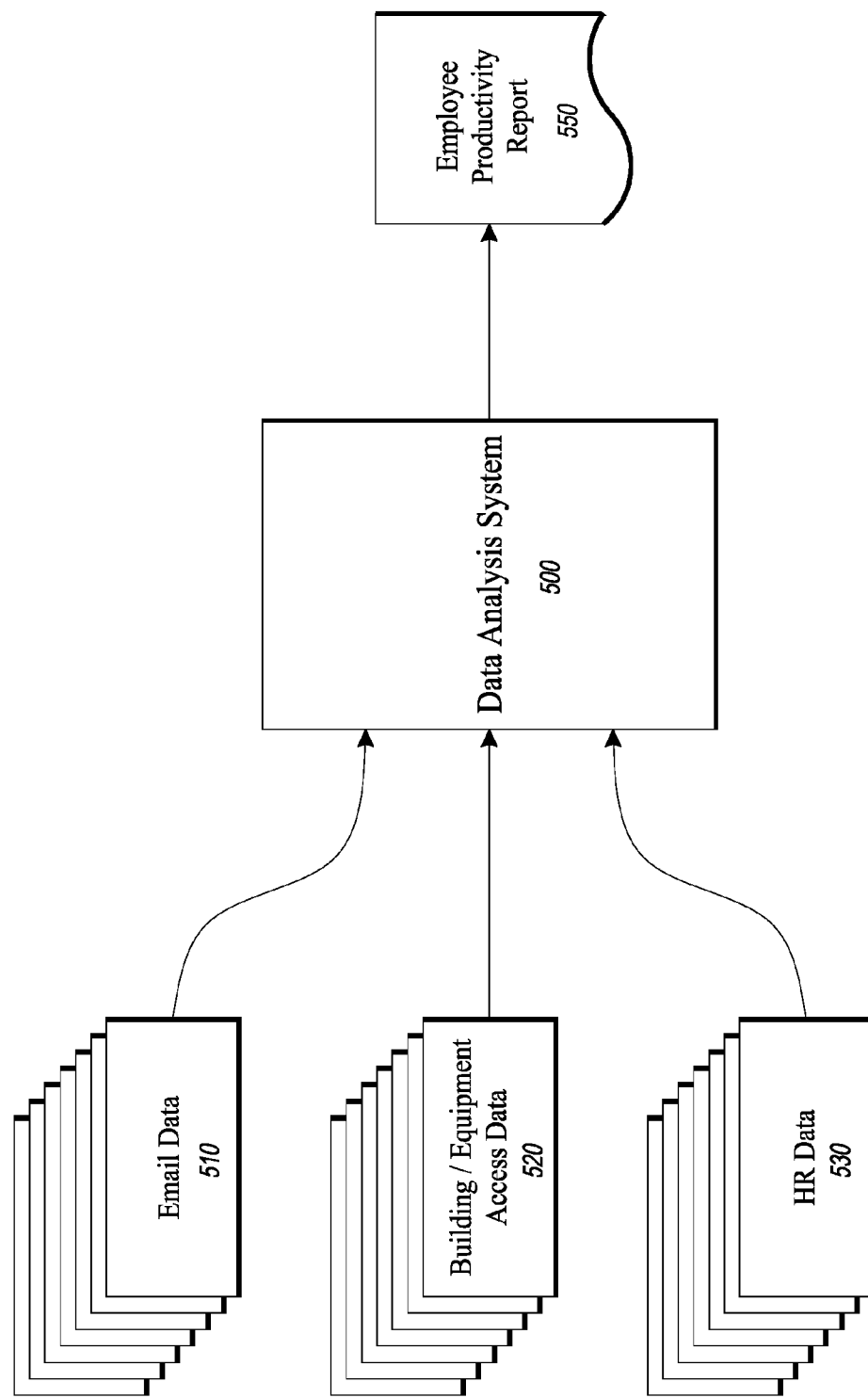
FIG. 5 is a flow diagram illustrating examples of types of data that can be aggregated and analyzed for employee efficiency and/or productivity analysis.

FIG. 5 is a flow diagram illustrating examples of types of data that can be aggregated and analyzed for employee efficiency and/or productivity analysis. In one embodiment, the data analysis system 500 accepts email data 510, building/equipment access data 520, and/or human resources data 530. Based on the imported data, the data analysis system 500 can produce an employee productivity report 550. The employee productivity report 550 can be based on any combination of data from multiple data sources.

As explained above, the building/equipment access data 520 and human resources data 530 can be cleansed and aggregated to perform security-based analysis (e.g., are there any suspicious system logins or remote access). The building/equipment access data 520 and human resources data 530 can also be combined to perform efficiency analysis (e.g., what are the work hour patterns of employees and how efficient are these employees). In other embodiments, the email data 510 can be combined with human resources data 530 to perform efficiency analysis (e.g., how does employee email activity affect efficiency). An organization can aggregate relevant data that can provide answers to specific queries about the organization. Certain details relating to analysis of employee efficiency or email activity is explained in more detail with respect to FIGS. 1-4 and 6-7.

The employee productivity report 550 can provide a comparison of an employee to individuals who share common characteristics. Depending on the embodiment, the employee may be compared to individuals who have different characteristics (e.g., supervisors). The comparison can also be between a group to which an employee belongs and a group to which an employee does not belong.

Figure 6:
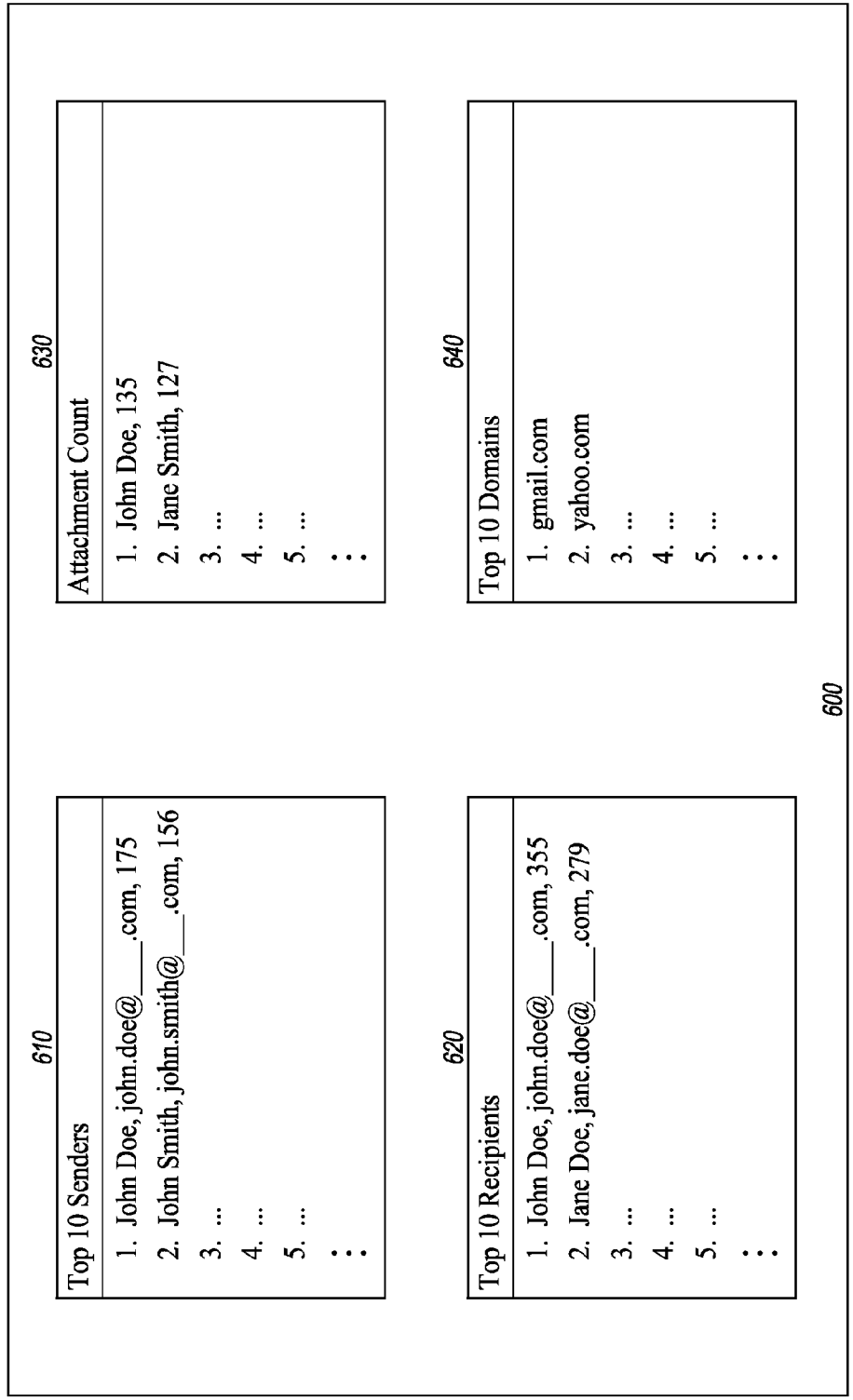
FIG. 6 illustrates an example user interface displaying an output of a data analysis system.

FIG. 6 illustrates an example user interface 600 displaying an output of a data analysis system. The data analysis system can be similar to systems explained in connection with FIGS. 1-2 and 8. The user interface 600 shows an example of results from employee email analysis. As illustrated, the user interface 600 includes a list of top 10 senders 610, a list of top 10 recipients 620, a list of attachment count 630, and a list of top 10 domains 640.

The list of top 10 senders 610 can include top 10 employees of an organization who sent the most number of emails in a specific time period. The top 10 senders list 610 can show, for each employee in the list, the name of the employee, the email address of the employee, and the total number of emails sent by the employee. The time period or span for which the list 610 is generated can vary depending on the requirements of the organization. For instance, the list 610 may include top 10 senders for a specific day, week, month, etc.

The list of top 10 recipients 620 may be similar to the list of top 10 senders 610. The top 10 recipients list 620 can include top 10 employees of the organization who received the most number of emails in a specific time period. The top 10 recipients list 620 can show, for each employee in the list, the name of the employee, the email address of the employee, and the total number of emails received by the employee. The time period or span for which the top 10 recipients list 620 is generated can be the same as the time period or span for the top 10 senders list 610.

The list of attachment count 630 can list top employees who have sent or received the most number of attachments. The attachment list 630 can display the name of the employee and the total number of attachments. The attachment list 630 can provide an overview of employees who may potentially use a large percentage of storage resources due to sending and/or receiving of numerous attachments.

The list of top 10 domains 640 can show the list of common domains from which emails are sent to the employees of the organization or common domains to which the employees send emails. In the example of FIG. 6, the top domains list 640 lists "gmail.com" as the top domain, "yahoo.com" as the second domain, and so forth. Since employees can send many internal emails, the domain for the organization may not be included in the top domain list.

In this manner, the data analysis system can provide an analysis of certain aspects of employee behavior. The email activity data may be combined and/or aggregated with other types of data in order to examine relationships between employee email activity and other aspects of employee behavior. Such relationships may provide insights into factors that affect employee efficiency.

FIG. 7 illustrates another example user interface 700 displaying an output of a data analysis system. The data analysis system can be similar to systems explained in connection with FIGS. 1-2 and 8. The user interface 700 shows an example of results from employee loan processing analysis. As illustrated, the user interface 700 includes columns for the following information: employee name 710, employee ID 715, employee position/title 720, employee location 725, average badge-in time 730, average badge-out time 735, average number of processed jobs 740, employee efficiency 745, percentage of total emails sent to applicants 750, and average percentage of total emails sent to applicants for others with the same title 755.

Employee name 710 can refer to the name of an employee, and employee ID 715 can be an identifier that designates a particular employee. Position/title 720 can refer to an employee's position or title. The user interface 700 shows two different positions: loan processor and loan processing supervisor. The location 725 can refer to the office location of an employee. The user interface 700 shows three different locations: A, B, and C.

The average badge-in time 730 can refer to the average time an employee badges in to the office during a period of time. The average badge-out time 735 can refer to the average time an employee badges out of the office during a period of time. The average can be calculated based on badge-in or badge-out times over a specific period of time, such as several days, a week, several weeks, a month, etc.

The average number of processed jobs 740 may refer to the number of loan jobs an employee processed over a period of time. The period of time can be determined as appropriate by the organization (e.g., a week, several weeks, a month, etc.). The time period over which the number of jobs is averaged may match the time period used for determining average badge-in time and badge-out time.

The employee efficiency 745 may refer to the efficiency level or indicator associated with an employee. The values shown in user interface 700 are low, medium, and high, but the efficiency level can be defined as any metric or scale that the organization wants.

The percentage of total emails sent to applicants 750 may refer to the percentage of emails sent to loan applicants out of all of the emails sent by an employee. In the user interface 700, 80% of Jane Doe's emails are sent to loan applicants, while 95% of John Smith's emails are sent to loan applicants. John Doe sends only 50% of his emails to loan applicants, and Jane Smith sends 85% of her emails to loan applicants.

The average percentage of total emails sent to applicants for other with the same title 755 can refer to the average percentage for employees that have the same position/title. The data analysis system can provide a point of comparison with other employees with respect to a specific attribute or property. In the example of FIG. 7, the average percentage column provides a point of comparison for percentage of emails sent to loan applicants with respect to employees having the same title. The average percentage for the position of "loan processing supervisor" is 52%, and the average percentage for the position of "loan processor" is 87%. This column can provide a point of comparison with other employees that have the same title. For example, John Doe's percentage of emails sent to applicants is very low compared to the average percentage for all employees who are loan processors.

The user interface 700 also includes a drop-down menu or button 760 that allows the user to change the comparison group. In the example of FIG. 7, the comparison group is other employees that have the same title. The comparison group can be changed by selecting a different category from the options provided in the drop-down menu 760. For example, the user can change the comparison group to employees at the same location or employees at the same location with the same title. The options in the drop-down menu can be a list of item or checkboxes. Depending on the embodiment, multiple items or checkboxes can be selected or checked. The comparison group can be changed by the user as appropriate, and the content displayed in the user interface 700 can be updated accordingly. In some embodiments, the comparison group can have different attributes from an employee, or can be different from the group to which an employee belongs. For example, the comparison group can include employees who have a different position, employees from a different department, etc.

The efficiency level or indicator 745 can be based on any combination of data that may be available to the data analysis system. As explained above, an efficiency indicator can provide information relating to one or more aspects of an employee's efficiency. In one example, the efficiency level can be based on the average number of processed jobs and the time spent in the office during a particular period of time. In another example, the efficiency level can be based on a comparison with other employees. In FIG. 7, the percentage of emails sent to applicants for an employee is compared to the average percentage of emails sent to applicants for employees having the same title. The efficiency level may incorporate the comparison to others having the same title. In such case, the efficiency level for John Doe can be very low since his percentage of emails sent to applicants is far below the average percentage for employees with the same title.

Implementation Mechanisms

According to one embodiment, the techniques described herein are implemented by one or more special-purpose computing devices. The special-purpose computing devices may be hard-wired to perform the techniques, or may include circuitry or digital electronic devices such as one or more application-specific integrated circuits (ASICs) or field programmable gate arrays (FPGAs) that are persistently programmed to perform the techniques, or may include one or more hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, server computer systems, portable computer systems, handheld devices, networking devices or any other device or combination of devices that incorporate hard-wired and/or program logic to implement the techniques.

Computing device(s) are generally controlled and coordinated by operating system software, such as iOS, Android, Chrome OS, Windows XP, Windows Vista, Windows 7, Windows 8, Windows Server, Windows CE, Unix, Linux, SunOS, Solaris, iOS, Blackberry OS, VxWorks, or other compatible operating systems. In other embodiments, the computing device may be controlled by a proprietary operating system. Conventional operating systems control and schedule computer processes for execution, perform memory management, provide file system, networking, I/O services, and provide a user interface functionality, such as a graphical user interface ("GUI"), among other things.

Figure 8:
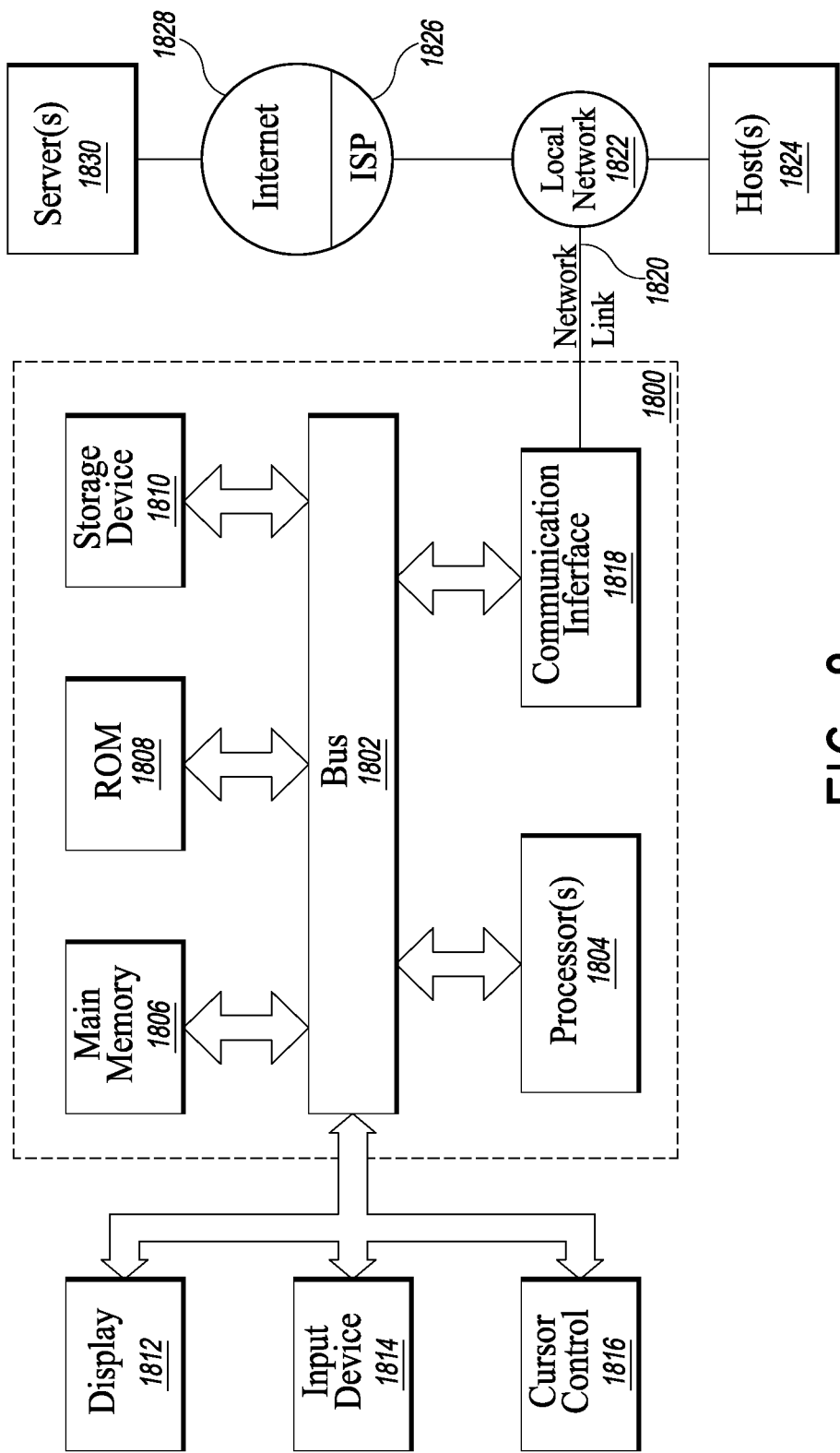
FIG. 8 is a block diagram illustrating a computer system with which certain methods discussed herein may be implemented.

For example, FIG. 8 is a block diagram that illustrates a computer system 1800 upon which an embodiment may be implemented. For example, the computing system 1800 may comprises a server system that accesses law enforcement data and provides user interface data to one or more users (e.g., executives) that allows those users to view their desired executive dashboards and interface with the data. Other computing systems discussed herein, such as the user (e.g., executive), may include any portion of the circuitry and/or functionality discussed with reference to system 1800.

Computer system 1800 includes a bus 1802 or other communication mechanism for communicating information, and a hardware processor, or multiple processors, 1804 coupled with bus 1802 for processing information. Hardware processor(s) 1804 may be, for example, one or more general purpose microprocessors.

Computer system 1800 also includes a main memory 1806, such as a random access memory (RAM), cache and/or other dynamic storage devices, coupled to bus 1802 for storing information and instructions to be executed by processor 1804. Main memory 1806 also may be used for storing temporary variables or other intermediate information during execution of instructions to be executed by processor 1804. Such instructions, when stored in storage media accessible to processor 1804, render computer system 1800 into a special-purpose machine that is customized to perform the operations specified in the instructions.

Computer system 1800 further includes a read only memory (ROM) 808 or other static storage device coupled to bus 1802 for storing static information and instructions for processor 1804. A storage device 1810, such as a magnetic disk, optical disk, or USB thumb drive (Flash drive), etc., is provided and coupled to bus 1802 for storing information and instructions.

Computer system 1800 may be coupled via bus 1802 to a display 1812, such as a cathode ray tube (CRT) or LCD display (or touch screen), for displaying information to a computer user. An input device 1814, including alphanumeric and other keys, is coupled to bus 1802 for communicating information and command selections to processor 1804. Another type of user input device is cursor control 1816, such as a mouse, a trackball, or cursor direction keys for communicating direction information and command selections to processor 1804 and for controlling cursor movement on display 1812. This input device typically has two degrees of freedom in two axes, a first axis (e.g., x) and a second axis (e.g., y), that allows the device to specify positions in a plane. In some embodiments, the same direction information and command selections as cursor control may be implemented via receiving touches on a touch screen without a cursor.

Computing system 1800 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "module," as used herein, refers to logic embodied in hardware or firmware, or to a collection of software instructions, possibly having entry and exit points, written in a programming language, such as, for example, Java, Lua, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules or computing device functionality described herein are preferably implemented as software modules, but may be represented in hardware or firmware. Generally, the modules described herein refer to logical modules that may be combined with other modules or divided into sub-modules despite their physical organization or storage Computer system 1800 may implement the techniques described herein using customized hard-wired logic, one or more ASICs or FPGAs, firmware and/or program logic which in combination with the computer system causes or programs computer system 1800 to be a special-purpose machine. According to one embodiment, the techniques herein are performed by computer system 1800 in response to processor(s) 1804 executing one or more sequences of one or more instructions contained in main memory 1806. Such instructions may be read into main memory 1806 from another storage medium, such as storage device 1810. Execution of the sequences of instructions contained in main memory 1806 causes processor(s) 1804 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 1810. Volatile media includes dynamic memory, such as main memory 1806. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between nontransitory media. For example, transmission media includes coaxial cables, copper wire and fiber optics, including the wires that comprise bus 1802. Transmission media can also take the form of acoustic or light waves, such as those generated during radio-wave and infra-red data communications.

Various forms of media may be involved in carrying one or more sequences of one or more instructions to processor 1804 for execution. For example, the instructions may initially be carried on a magnetic disk or solid state drive of a remote computer. The remote computer can load the instructions into its dynamic memory and send the instructions over a telephone line using a modem. A modem local to computer system 1800 can receive the data on the telephone line and use an infra-red transmitter to convert the data to an infra-red signal. An infra-red detector can receive the data carried in the infra-red signal and appropriate circuitry can place the data on bus 1802. Bus 1802 carries the data to main memory 1806, from which processor 1804 retrieves and executes the instructions. The instructions received by main memory 1806 may retrieves and executes the instructions. The instructions received by main memory 1806 may optionally be stored on storage device 1810 either before or after execution by processor 1804.

Computer system 1800 also includes a communication interface 1818 coupled to bus 1802. Communication interface 1818 provides a two-way data communication coupling to a network link 1820 that is connected to a local network 1822. For example, communication interface 1818 may be an integrated services digital network (ISDN) card, cable modem, satellite modem, or a modem to provide a data communication connection to a corresponding type of telephone line. As another example, communication interface 1818 may be a local area network (LAN) card to provide a data communication connection to a compatible LAN (or WAN component to communicated with a WAN). Wireless links may also be implemented. In any such implementation, communication interface 1818 sends and receives electrical, electromagnetic or optical signals that carry digital data streams representing various types of information.

Network link 1820 typically provides data communication through one or more networks to other data devices. For example, network link 1820 may provide a connection through local network 1822 to a host computer 1824 or to data equipment operated by an Internet Service Provider (ISP) 1826. ISP 1826 in turn provides data communication services through the world wide packet data communication network now commonly referred to as the "Internet" 1828. Local network 1822 and Internet 1828 both use electrical, electromagnetic or optical signals that carry digital data streams. The signals through the various networks and the signals on network link 1820 and through communication interface 1818, which carry the digital data to and from computer system 1800, are example forms of transmission media.

Computer system 1800 can send messages and receive data, including program code, through the network(s), network link 1820 and communication interface 1818. In the Internet example, a server 1830 might transmit a requested code for an application program through Internet 1828, ISP 1826, local network 1822 and communication interface 1818.

The received code may be executed by processor 1804 as it is received, and/or stored in storage device 1810, or other non-volatile storage for later execution.

Each of the processes, methods, and algorithms described in the preceding sections may be embodied in, and fully or partially automated by, code modules executed by one or more computer systems or computer processors comprising computer hardware. The processes and algorithms may be implemented partially or wholly in application-specific circuitry.

The various features and processes described above may be used independently of one another, or may be combined in various ways. All possible combinations and subcombinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure. The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

What is claimed is:

1. A computer system configured to aggregate and analyze data from a plurality of data sources, the computer system comprising:
one or more hardware computer processors configured to execute code in order to cause the system to:
obtain first and second data from a plurality of data sources, the plurality of data sources comprising a first data source and a second data source, wherein the first data source and the second data source are different from one another, each of the first data source and the second data source comprising one or more of: email data, system logon data, system logoff data, badge swipe data, employee data, software version data, software license data, remote access data, phone call data, work production data, VPN login data, remote access data, or job processing data, each data source of the plurality of data sources associated with a plurality of employees, wherein for each data source, each employee of the plurality of employees is associated with a respective identifier;
detect a discrepancy associated with data from the first data;
in response to the detection of the discrepancy, reobtain first data from the first data source;
detect inconsistencies in formatting of data from each of the reobtained first data and the second data;
transform data from each of the reobtained first data and the second data into a format that is compatible for combining data from respective data sources of the plurality of data sources, and wherein the reobtained first data and the second data comprise different identifiers that identify the same employee;

generate a mapping of unique employees from the plurality of employees to data from each of the reobtained first data and the second data, wherein the mapping is based at least in part on correlating each employee's respective identifier to the different identifiers from the reobtained first data and the second data that identify the same employee;

generate combined data by combining data from the reobtained first data and the second data;

generate an intermediate output based at least in part on the combined data associated with respective employees and the mapping, wherein the intermediate output associated with a particular employee comprises a reduced version of the combined data associated with the particular employee from the plurality of data sources, and wherein the intermediate output associated with the particular employee summarizes at least some of data items associated with efficiency indicators of the particular employee;

determine a plurality of efficiency indicators for the respective employees based at least in part on a comparison of data from the intermediate output associated with the respective employees and other employees that have at least one common characteristic, wherein the at least one common characteristic comprises at least a common job title or job description, wherein the plurality of efficiency indicators provides information relating to efficiency of the respective employees having the at least one common characteristic, and wherein a first efficiency indicator of the plurality of efficiency indicators is based at least in part on intermediate output associated with email summary data of the respective employees, and wherein a second indicator of the plurality of efficiency indicators is based at least in part on intermediate output associated with at least an average work product statistic over a period of time for the respective employees, and wherein the average work product statistic comprises a correlation between the email summary data and the common job title or job description for the respective employees; and display, in a user interface, summary data relating to at least some of the respective employees, wherein the at least some of the respective employees share at least one common characteristic, and wherein the summary data comprises the first efficiency indicator and the second efficiency indicator for the at least some of the respective individuals.

2. The system of claim 1, wherein the code is further configured to cause the computer system to:

access expected format information indicating an expected format of data from the first data source; and determine whether data from the first data source is consistent with the expected format.

3. The system of claim 1, wherein said generating of the combined data comprises:

mapping a first column in the first data source to a second column in the second data source.

4. The system of claim 1, wherein a first data item of the first data source comprises a first identifier that refers to a first employee, and a second data item of the second data source comprises a second identifier that refers to the first employee, wherein the first identifier and the second identifier are different; and said transforming of data items comprises mapping the first identifier and the second identifier.

5. The system of claim 1, wherein the code is further configured to cause the system to:

in response to the detection of inconsistencies in formatting of data from the second data, reobtain second data from the second data source.

6. The system of claim 1, wherein data of the first data source has a different format from data of the second data source.

7. The system of claim 1, wherein data from a data source of the plurality of data sources is in one or more of the following formats: database, web service, flat file, and log file.

8. The system of claim 1, wherein the at least one common characteristic further comprises at least one of a location, a department, or a supervisor.

9. The system of claim 1, wherein:

the first data source comprises employee data and the second data source comprises email data, wherein the employee data comprises one or more of an employee identifier, an employee name, and an employee email address for each of a plurality of employees; and the code is further configured to cause the system to associate data from the respective data sources of the plurality of data sources at least partly by associating the employee data and the email data to unique employees.

10. A computer system configured to aggregate and analyze data from a plurality of data sources, the computer system comprising:

one or more hardware computer processors configured to execute code in order to cause the system to:

access first and second data from a plurality of data sources, the plurality of data sources comprising a first data source and a second data source, wherein the first data source and the second data source are different from one another, each of the first data source and the second data source comprising one two or more of: email data, system logon data, system logoff data, badge swipe data, employee data, software version data, software license data, remote access data, phone call data, work production data, VPN login data, remote access data, or job processing data, each data source of the plurality of data sources associated with a plurality of workers, wherein for each data source, each worker of the plurality of workers is associated by a respective identifier;

detect a discrepancy associated with data from the first data;

in response to the detection of the discrepancy, reaccess first data from the first data source;

detect inconsistencies in formatting of data from each of the reaccessed first data and the second data;

transform data from each of the reaccessed first data and the second data into a format that is compatible for combining data from respective data sources of the plurality of data sources, and wherein the reaccessed first data and the second data comprise different identifiers that identify the same employee;

generate a mapping of data items from each of the reaccessed first data and the second data to respective workers of the plurality of workers, wherein the mapping is based at least in part on correlating each worker's respective identifier to the different identifiers from the reaccessed first data and the second data that identify the same employee;

generate combined data by combining data from the reaccessed first data, the second data, and the mapping;

generate an intermediate output based at least in part on generating summary data associated with some data items of the combined data; and display, in a user interface, statistics associated with the respective workers based on the intermediate output, wherein the statistics indicate efficiency of the respective workers who have at least one common characteristic and wherein the at least one common characteristic comprises at least a common job description or job title, and wherein the statistics are associated with work productivity data over a period of time for the respective workers, and wherein the work productivity data comprises a correlation between email summary data and the common job description or job title of the respective workers.

11. The system of claim 10, wherein the code is further configured to cause the computer system to:

access expected format information indicating an expected format of data from the second data source; and determine whether the second data from the second data source is consistent with the expected format.

12. The system of claim 10, wherein said transforming of the data items comprises converting a time in a first time zone to a time in a second time zone.

13. The system of claim 10, wherein:

a first data item of the first data source comprises a first identifier that refers to a first worker, and a second data item of the second data source comprises a second identifier that refers to the first worker, wherein the first identifier and the second identifier are different; and said transforming of data items comprises mapping the first identifier and the second identifier.

14. The system of claim 10, wherein:

the first data source comprises employee data and the second data source comprises email data, wherein the employee data comprises one or more of an employee identifier, an employee name, and an employee email address for each of a plurality of employees;

the employee data and the email data are associated to respective employees of the plurality of employees; and the code is further configured to cause the computer system to generate a report relating to employee email activity based at least in part on data associated with the respective employees, the report comprising a list of top email senders, a list of top email recipients, a list of attachment count, and a list of top email domains.

15. The system of claim 10, wherein the intermediate output comprises a list of top emails senders and a list of top email recipients for each respective worker.

16. The system of claim 10, wherein an inconsistency in formatting of at least one data item comprises an inconsistency from an expected format of a column of the at least one data item.

17. The system of claim 10, wherein an inconsistency in formatting of at least one data item comprises an inconsistency from an expected size of the at least one data item.

18. The system of claim 10, wherein:

the first data source comprises employee data, the employee data comprising one or more of an employee identifier, an employee name, and an employee email address for a first plurality of employees;

the second data source comprises job processing data, the job processing data comprising information relating to jobs processed by a second plurality of employees;

the employee data and the job processing data are associated to respective employees of the first plurality of employees and the second plurality of employees; and the code is further configured to cause the computer system to generate a report relating to employee job processing activity based at least in part on data associated with the respective employees, the report comprising an efficiency level of the respective employees.

19. A non-transitory computer readable storage medium comprising instructions for aggregating and analyzing data from a plurality of data sources that cause a computer processor to:

access first and second data from a plurality of data sources, the plurality of data sources comprising a first data source and a second data source, wherein the first data source and the second data source are different from one another, each of the first data source and the second data source comprising one or more of: email data, system logon data, system logoff data, badge swipe data, employee data, software version data, software license data, remote access data, phone call data, work production data, VPN login data, remote access data, or job processing data, each data source of the plurality of data sources associated with a plurality of employees, wherein for each data source, each employee of the plurality of employees is associated by a respective identifier;

detect a discrepancy associated with data from the first data;

in response to the detection of the discrepancy, reaccess first data from the first data source;

detect inconsistencies in formatting of data from each of the reaccessed first data and the second data;

transform data from each of the reaccessed first data and the second data into a format that is compatible for combining data from respective data sources of the plurality of data sources, and wherein the reaccessed first data and the second data comprise different identifiers that identify the same employee;

associate data items from each of the reaccessed first data and the second data to respective employees of the plurality of employees, wherein the association is based at least in part on correlating each employee's respective identifier to the different identifiers from the reaccessed first data and the second data that identify the same employee;

generate combined data by combining data from two or more data sources from the reaccessed first data, the second data, and the associated data items; and generate an intermediate output based at least in part on generating summary data associated with some data items of the combined data; and generate output data comprising statistics associated with the respective employees based at least in part on the the intermediate output, wherein the statistics indicate efficiency of respective employees who have at least one common characteristic and wherein the at least one common characteristic comprises at least a common job description or job title, and wherein the statistics are associated with work productivity data over a period of time for the respective workers, and wherein the work productivity data comprises a correlation between email summary data and the common job description or job title of the respective employees.

20. The computer readable storage medium of claim 19, wherein the intermediate output comprises a list of top emails senders and a list of top email recipients for each respective worker.

* * * * *